J. TOLER.
Casters.

No. 139,212. Patented May 20, 1873.

Witnesses:
Michael Ryan,
Fred Haynes

John Toler
by his Attorneys
Ronn & Allen

UNITED STATES PATENT OFFICE.

JOHN TOLER, OF NEWARK, NEW JERSEY.

IMPROVEMENT IN CASTERS.

Specification forming part of Letters Patent No. 139,212, dated May 20, 1873; application filed April 17, 1873.

*To all whom it may concern:*

Figure 1:
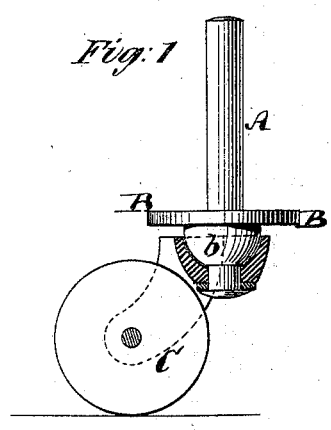
Figure 2:
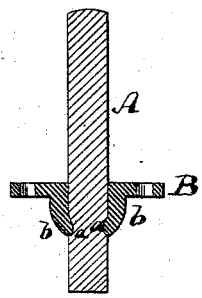
Figure 3:
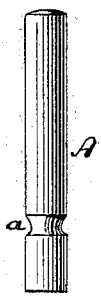

Be it known that I, JOHN TOLER, of Newark, in the county of Essex and State of New Jersey, have invented an Improved Furniture-Caster, of which the following is a specification:

Figure 1 is a partly-sectional side view of my improved furniture-caster. Fig. 2 is a detail longitudinal section of the spindle and flange; Fig. 3, a detail side view of the spindle; and Fig. 4, a detail central section of the flange, showing it as it appears before being applied to the spindle.

Similar letters of reference indicate corresponding parts in all the figures.

The object of this invention is to facilitate the application of the flange to the spindle of a furniture-caster in such manner as to economize time and labor, and consequently reduce the cost of making the same, and make a very secure attachment. The invention consists in forming a circular groove in the caster-spindle, and a downwardly or upwardly projecting sleeve on the flange, which sleeve, when applied with the flange to the spindle, has its end bent into the aforementioned groove, thereby taking firm hold of the spindle and becoming intimately connected with the same. The ordinary process of soldering the spindle to the flange, or the still more expensive fastening produced by squaring the spindle and fitting it into a corresponding aperture of the flange, is thereby overcome, and I am enabled to cut the spindle from a wire and leave it otherwise intact, excepting the formation of the groove, which is easily produced. The sleeve-projection on the flange is preferably tapered toward its end, so as to be readily pressed into the groove.

Figure 4:

In the accompanying drawing, the letter A represents the spindle of a furniture-caster. B is the flange of the same. The connection of the spindle with the wheel C is of suitable kind, and does not form part of this invention. The spindle is entirely of cylindrical form, and has a groove, $a$, cut into it, while the flange B has a projecting sleeve, $b$, formed on it, said sleeve tapering (by preference) toward its end, as shown in Fig. 4, so that it can, after application to and around the spindle, be easily pressed or crowded into the groove $a$, in the manner clearly indicated in Fig. 2. When this crowding process is properly performed the connection of the spindle and flange become so intimate as to make the two parts absolutely one, preventing all longitudinal displacement of the flange on the spindle, and vice versa, and also the turning of the flange on the spindle.

I prefer to make the flange B, with its sleeve $b$, of malleable cast-iron, so that it may be cheaply produced and readily bent or swaged, in the manner described.

I claim as my invention, and desire to secure by Letters Patent—

The grooved spindle A, combined with the flange B of malleable metal, which has a projecting sleeve, $b$, forced to partly enter said groove to retain the thimble, substantially as and for the purpose described.

JOHN TOLER.

Witnesses:
P. H. SIMONDS,
FRANCIS J. TOLER.